United States Patent [19]

Lemelson

[11] Patent Number: 4,933,852
[45] Date of Patent: Jun. 12, 1990

[54] MACHINE OPERATION INDICATING SYSTEM AND METHOD

[76] Inventor: Jerome H. Lemelson, 85 Rector Street, Metuchen, N.J. 08840

[21] Appl. No.: 686,907

[22] Filed: Dec. 27, 1984

Related U.S. Application Data

[63] Continuation-in-part of Ser. No. 188,049, Sep. 17, 1980, which is a continuation-in-part of Ser. No. 68,609, Aug. 22, 1979, and Ser. No. 110,542, Jan. 8, 1980, abandoned.

[51] Int. Cl.$^5$ .............................................. G06F 15/20
[52] U.S. Cl. ........................... 364/424.03; 364/424.04;
340/438; 340/439
[58] Field of Search ............... 364/424, 436, 551, 561,
364/442, 550, 425, 424.03, 424.04, 551.01;
371/25, 29; 381/51; 340/52 R, 52 F, 438, 439;
73/11 G, 117.2, 117.3

[56] References Cited

U.S. PATENT DOCUMENTS

| | | | |
|---|---|---|---|
| 3,870,818 | 3/1975 | Barton et al. | 340/52 F |
| 3,899,671 | 8/1975 | Stover | 364/436 |
| 3,952,301 | 4/1976 | Sorkin | 364/424 |
| 4,031,363 | 6/1977 | Freeman et al. | 364/425 |
| 4,159,531 | 6/1979 | McGrath | 364/424 |
| 4,188,618 | 2/1980 | Weisbart | 340/52 F |
| 4,215,240 | 7/1980 | Ostrowski | 381/51 |
| 4,241,403 | 12/1980 | Schultz | 364/551 |
| 4,258,421 | 3/1981 | Juhasz et al. | 364/424 |
| 4,267,569 | 5/1981 | Baumann et al. | 364/424 |
| 4,291,373 | 9/1981 | Mizote et al. | 364/436 |
| 4,344,136 | 8/1982 | Panik | 340/52 F |
| 4,523,283 | 6/1985 | Muhlberger et al. | 364/550 |
| 4,525,782 | 6/1985 | Wohlfarth et al. | 364/551 |
| 4,533,900 | 8/1985 | Muhlberger et al. | 364/424 |

Primary Examiner—Gary chin

[57] ABSTRACT

An apparatus and method for indicating operational characteristics of a machine, such as a motor vehicle or other type of human operator or monitored machine which is subject to variations in its operational characteristics requiring adjustments, maintenance or replacement of machine parts. In particular, the system and method involve the generation of synthetic speech signals which are converted to sounds of words and phrases or sentences which describe the operational characteristics of the machine and, in certain instances, suggest remedies or procedures to be taken by an operator or maintenance personnel to prevent machine malfunction, improve its operation and, in certain instances, optimize the manner in which it performs. Both analysis of the operational characteristics or ambient conditions to which the machine is subjected are effected by a plurality of sensors of such conditions and a computer or microelectronic processor which processes the outputs of the sensors and determines such operational characteristics, further controlling the operation of an electronic synthetic speech signal generator for generating speech signals which are converted to words, phrases and, in certain instances, sentences defining the operation and further defining suggested maintenance or variations in the operation to be taken by the operator thereof. Unsafe operating conditions may be electronically detected and immediately indicated or indicated at a future time when a memory is queriead.

12 Claims, 2 Drawing Sheets

MACHINE OPERATION INDICATING SYSTEM AND METHOD

FIELD OF THE INVENTION

This invention relates to an apparatus and method for indicating certain variations in the operation of a machine, such as a motor vehicle or other types of human operated or human maintained machine, wherein such indications are effected in the form of synthetically generated speech, preferably generated by a microelectronic speech synthesizing circuit which includes analyzing means for signals received thereby in sensing the operation of the machine or certain ambient conditions such as temperature, pressure, noise and vibrations of machine components. The system is particularly applicable for warning or indicating certain malfunctions, poor operation or pending conditions which will result in disruption of operation of the machine or vehicle. By indicating to the operator, maintenance personnel or a person monitoring the operation of the machine, in verbal terms, together with perhaps display indications of the operation of the machine, the attention of the operator is immediately directed to the condition effecting such poor or hazardous operation, thereby resulting in an immediate warning of such condition for such person to take corrective action to prevent damage to the machine or improve its operation.

DESCRIPTION OF THE PRIOR ART

Prior art systems for indicating motor vehicle operating characteristics include dashboard mounted displays, such as dial or pointer indicators, lamps switched on and off and electrically operated buzzers and bells. Speech synthesizing circuits have also been employed, as disclosed in U.S. Pat. No. 3,870,818, to indicate such bistable conditions as low oil and gas levels, failure to buckle seat belts, low brake fluid, etc. when such conditions are present. Magnetic tape players have also been employed to deliver prerecorded messages relating to road information as disclosed in U.S. Pat. No. 4,190,819. U.S. Pat. No. 3,964,018 discloses a motor vehicle monitoring system which also detects and displays such bistable or limit variables as low levels of water, oil and air pressures and danger levels of engine temperature.

OBJECTS OF THE INVENTION

A primary object of this invention is to provide new systems and methods for monitoring machine and vehicle operation.

Another object is to provide an apparatus and method for verbally warning of poor operating condition or malfunction of a machine and also verbally indicating what step or steps should be taken to prevent such malfunction or to overcome same.

Another object is to provide a monitoring system for machines wherein audible verbal indications are automatically generated for informing an operator or maintenance person as to what maintenance or corrective steps to take to reestablish or improve machine operation.

Another object is to provide a system and method for automatically indicating with speech sounds, parameters associated with the operation of a motor vehicle and for verbally warning the operator thereof when unsafe conditions exist and when maintanance is required resulting from malfunctioning of certain components of the vehicle or its drive means.

Another object is to provide a combined indicating system for verbally indicating with synthetic speech when routine maintenance functionsare required to be performed with respect to a machine, when unsafe operating conditions exist and when a part or system has failed or is about to fail or malfunction.

Another object is provide a synthetic speech generating and control system for use in a motor vehicle, manufacturing or materials handling machines capable of performing a variety of condition indicating and warning functions employing a single display and single synthetic speech generator.

The above and other objects of the invention will become apparent from the accompanying drawings and the specification.

DESCRIPTION OF THE PREFERRED EMBODIMENT

Figure 1:
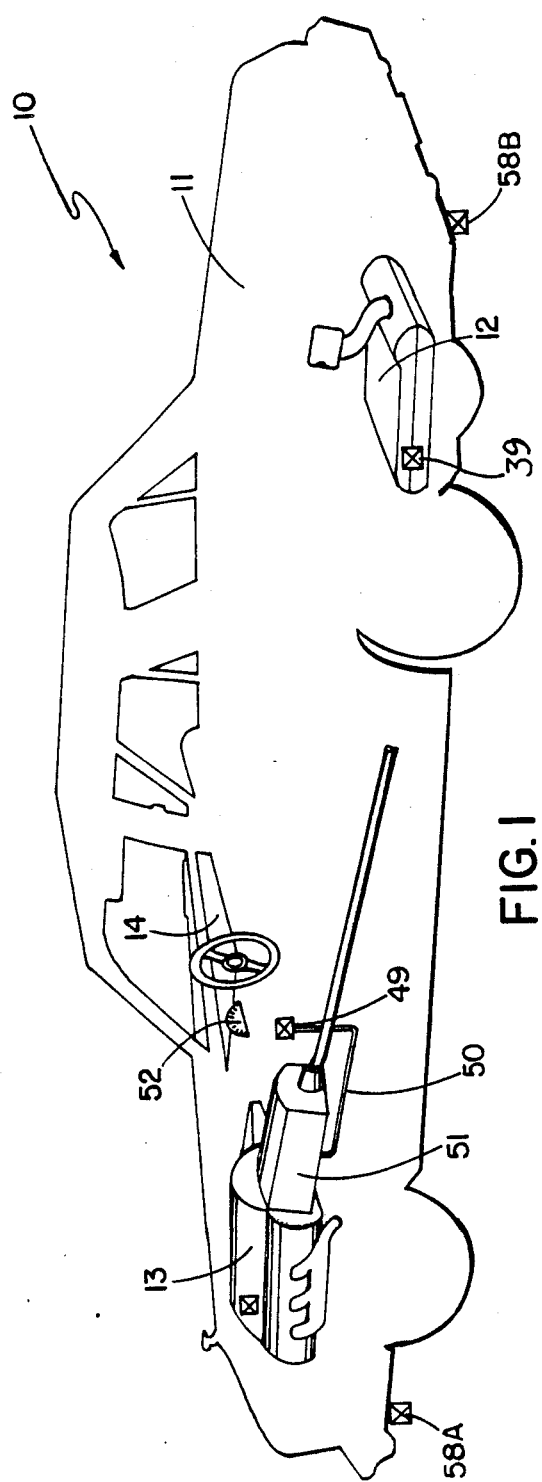
FIG. 1 is an isometric view of a motor vehicle and components thereof being monitored.

In FIG. 1 is illustrated a system for indicating a plurality of operating conditions of a machine or motor vehicle and, in certain instances, for verbally commanding or prescribing maintenance steps to be taken to prevent malfunction, stoppage or dangerous operation of the machine or motor vehicle. System illustrated in FIG. 1 is applicable to an operating motor vehicle, such as an automobile, truck, bus or other wheeled vehicles and it is noted that certain features thereof may also be applicable to boats and aircraft.

Such variables as engine or peripheral device temperature, fuel level, operational speed, oil pressure, requirements for oil change or lubrication, operational conditions to maximize fuel economy, proximity or nearness of an object such as another vehicle or other object, may be indicated both by visual display means and audio indicating means, such as words, phrases and sentences generated on the output of a speaker in accordance with synthetic speech signals applied thereto.

A system 10, illustrated in FIG. 1, is provided with respect to a motor vehicle or automobile 11 containing a number of operating condition sensors, such as a fuel level sensor 39 located in or adjacent a fuel tank 12 and operable to sense fuel level, one or more temperature sensors 35 located in or adjacent to vehicle engine or motor 13, a speed-distance sensor 49 located in a speedometer or attached to the speedometer cable 50 between a drive transmission 51 and a speedometer 52, the latter being located on the dashboard 14 of the motor vehicle. Also illustrated in FIG. 1 are respective forward and rearward looking radar units 58A and 58B.

Figure 2:
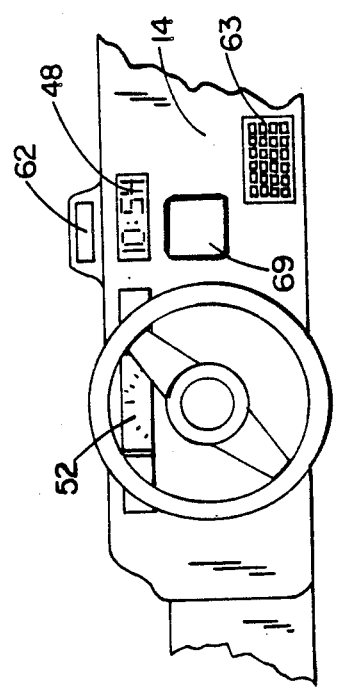
FIG. 2 is a view of the dashboard of the vehicle.

A portion of the dashboard 14 of the vehicle 11 is shown in FIG. 2 containing a speedometer 52, digital numeric display, keyboard 63 and speaker unit 69 which may be the radio speaker for the radio or tape playing unit of the motor vehicle operable to generate sounds of synthetic speech to be described hereafter.

Figure 3:
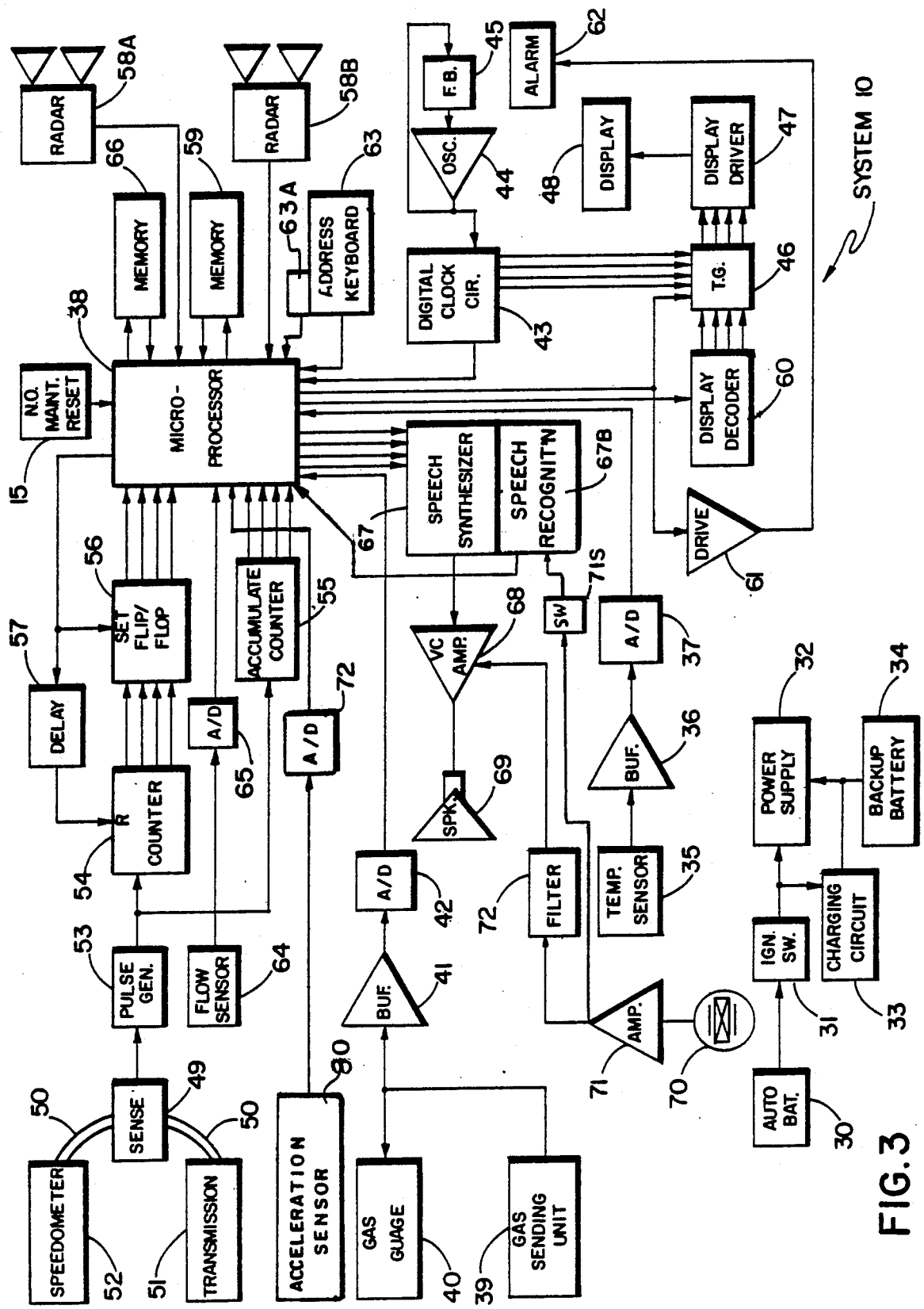
FIG. 3 is a schematic diagram of the control system associated with the machine or motor vehicle for indicating its operating condition.

In FIG. 3A is shown components of a source of electrical energy for energizing system 10 to perform as described wherein such energy is available even when the ignition switch for the vehicle ignition system is open. The automobile battery 30 which supplies power for the ignition system supplies electrical energy for energizing a conventional power supply 32 whenever the automobile ignition switch 31 is closed and such power supply provides a regulated voltage or voltages to the components of the system 10 illustrated in FIG. 3. The power supply 32 is assumed to be of the proper parameters and contains respective leads which are appropriately connected to the components of system 10 which are shown in FIG. 3.

When ignition switch 31 is closed, such as when the engine of the vehicle is operating, electrical energy from the automobile or vehicle battery and/or the voltage generator or magneto of the vehicle is also gated to a charging circuit 33 which charges a back-up battery 34 which functions to supply minimal power to the components of system 10 through the power supply 32. The back-up battery 34 may be connected directly to the power supply 32 or through contacts of the ignition switch which close when the main contacts of the switch connecting the battery to the ignition components of the vehicle are open so that the back-up battery will not be drained of its energy when sufficient power is derived from the vehicle battery and/or the magneto or generator operating off the engine shaft.

As shown in FIG. 3, engine operating temperature is sensed by a thermistor 35 or other suitable temperature sensor or sensors properly located on the engine, the output of which sensor is amplified in a buffer 36 and is converted to digital form for processing by a computer or electronic microprocessor 38, by an analog-to-digital converter 37. If such signals are indicative of excess operating temperature, the computer 38 is programmed with information from one of its memories 59,66 to display the condition and activate a warning device or display as described hereafter. A fuel sensing device 39, such as a float operated sensor or switch or other conventional liquid level indicator, generates a signal which is indicative of fuel level in the fuel tank, and may be used per se or in combination with the conventional fuel gage 40 for indicating to the computer 38 the level of stored fuel. Such signal is passed to a buffer amplifier 41, the output of which is connected to an analog-to-digital converter 42, the digital signal output of which is passed to the computer 38 which may process and use same in calculating fuel economy for displaying such information as described and, in certain instances, for providing output signals for fuel-air mixture or carburetor control to optimize engine operation. A digital clock circuit 43 driven by an oscillator 44 with a frequency determinant feedback circuit 45 such as a precision quartz crystal, provides a digital code for the microprocessor 38, which code is representative of time of day, day of month, etc. and is used by the microprocessor to determine maintenance functions to be performed, such as winterizing and other functions associated with ambient temperature by comparison with signals derived from its memory. The time signals are also passed through a transmission gate 46 to operate a display driver 47 for causing a digital electronic display 48 to display time and date.

A sensor 49, such as a microminiature light source and photodetector and a light interruption means driven by rotation of the speedometer shaft or cable 50 extending from the transmission 51 or drive shaft of the vehicle, converts rotations of the speedometer shaft to pulse electrical signals which trigger a pulse generator, the output of which is applied to a pulse counter 54 and a cumulative counter 55, the latter operating to generate a digital code indicative of the distance travelled by the vehicle from a given time, which code is transmitted to the microprocessor 38 for use in computing various maintenance requirements. Counter 54 accumulates pulses from pulse generator 53 and generates a digital code which is applied to a flip-flop switch 56 which is operable to input data to the computer or microprocessor 38 whenever it receives a trigger pulse passed thereto from the digital clock circuit 43, as enabled by a control signal from a microprocessor 38. The output of the flip-flop 56 is representative of the speed of the vehicle and is transmitted to the microprocessor 38. Such trigger pulse, which sets the flip-flop 56, also resets the counter 54 to zero, after passing through a delay circuit 57 thereby conditioning such counter for counting the next cycle.

A radar detecting unit 58A is also provided to determine the distance of the vehicle between objects in front of the vehicle and to provide such distance information as a digital code to the microprocessor 38 with processes such coded information and the information received regarding the speed of the vehicle from flip-flop 56 to determine if the speed-distance information or ratio is such as to indicate that a collision may soon occur. If such condition exists, as indicated by signals generated by or within the microprocessor 38 from information recorded therein, such as pre-programmed information stored in the memory 59 of the microprocessor, circuits in the microprocessor generate a digital code which is indicative of such condition and such code is output to a display decoder 60, the output of which is transferred to the display driver 47 through the transmission gate 46 when such condition exists for displaying a warning signal to the driver of the vehicle. The same signal from the microprocessor applied to transmission gate 46 is also applied to an alarm driver 61 for activating an alarm 62, such as a flashing light, bell or other noisemaking transducer, for immediately drawing the attention of the driver to the emergency condition. Similarly, other emergency conditions may also be indicated by signals applied to the alarm 62 and the display means 48 or auxiliary alarm and display means, such as engine overheating, as indicated by sensor 35, excessive vehicle speed, where speed limiting values are preprogrammed in the microprocessor or entered therein by a suitable input means, such as an encoded keyboard 63. Such information is compared with the signal generated on the output of flip-flop 56 and may also include an indication of a low fuel level in the fuel tank derived from analog-to-digital converter 42, low efficiency in operation of the motor vehicle as calculated by the microprocessor 38 from signals indicative of vehicle speed received from the flip-flop 56 and fuel flow signals generated by flow sensor 64 and received from the analog-to-digital converter 56 connected thereto.

Various maintenance intervals, as determined by time signals derived from the digital clock circuit 43 and/or distance signals derived by cumulative counter 55, may be indicated and controlled by signals generated by the microprocessor 38 by its comparison of signals derived from such circuits with signals generated by recordings of information relating to the maintenance periods, such as entered by keyboard 63 and stored in memory 66 or preprogrmmed in such memory as part of the microprocessor. An indication of the need for such maintenance may be displayed whenever the ignition switch is closed to start the motor vehicle and the alarm 62 may also be activated whenever the ignition circuit is energized until a normally open maintenance reset switch 63A is momentarily activated by hand. Such information as requirements for oil change, lubrication, oil filter change, air filter cleaning, tire rotation, etc. Additional information associated with the operation of a motor vehicle, such as the use of seatbelts as indicated by the closure of a switch when the belt is connected, the leaving of a key in the ignition switch when the door of the vehicle is opened, etc. may also be indicated on the digital display and/or by means of the alarm device.

In addition to indicating the variables and conditions described above, by means of a display and alarm, such conditions may also be audibly indicated by vocal means as a result of the use of a speech synthesizing circuit 67, such as the Texas Instruments microprocessor TNC0820 and its requisite support circuitry. The speech synthesizer 67 converts a digital code output of microprocessor 38 received thereby or suitable control signals from the microprocessor, into electronic signals, such as code signals, representative of words defining the verbalization of the condition to be indicated by speech sounds and transmit such information to a voltage controlled amplifier 68 which is connected to a loud speaker 69 to provide audible sound as synthetic words for the driver of the vehicle. The volume of the reproduced audible signals is controlled by the amplification factor of the voltage controlled amplifier 68 which itself is controlled by the level of the ambiant sound in the vehicle cabin interior as determined by signals generated by a microphone 70 and amplified in an amplifier 71, the output of which is converted to a direct current control voltage level by a filter 72.

Also shown in FIG. 3 is a sensor 73 operable for sensing accelerations and decelerations of the vehicle in one or a number of directions and generating output analog signals which are passed to an analog-to-digital converter 74 which is connected to pass digital signals indicative of accelerations and decelerations of the vehicle during its operation to the microcomputer 38 for analysis thereby. If the circuits analyzing the acceleration and deceleration signals in device 38 determine that the vehicle is being operated unsafely or in a reckless manner as a result of the characteristics of the signals received by comparison with signals reproduced from a memory in the microprocessor, signal indications of such hazzardous driving may be recorded in a memory in the microprocessor or an auxilliary memory connected to an output or outputs of the microprocessor which memory is addressable to provide the recordings or indications of such unsafe or hazzardous vehicle operation as output signals when the keyboard 63 is properly operated or when an auxilliary addressing means such as another keyboard, controller or computer is connected through keyboard or otherwise to the memory in which such hazzardous driving indications are recorded. The reproduced signals including a code indicative of the identity of the motor vehicle or its driver may be transmitted to another computer and recorded or processed thereat or used to control a hard copy printer to indicate the manner in which the vehicle has been driven over a selected period of time.

The signals indicative of the manner in which the vehicle has been driven or of a hazzardous driving condition, when generated by the microprocessor 38, may also be applied to the driver 61 to activate the alarm 62; to the display decoder or driver 60 to activate the display 48 to display an indication of the unsafe or hazzardous condition imposed by the driver's handling of the vehicle.

The signals indicative of the manner in which the vehicle has been driven may also be passed to the speech synthesizer 67 and may be operable to cause the generation of speech signals which are converted to sounds of words which indicate to the driver of the motor vehicle that he is not handling or driving the vehicle properly or is driving recklessly.

It is noted that signals generated by forward looking radar 58A may be analyzed by the microprocessor 38 together with signals generated by the accelerometer 70 to better determine the nature of the hazzardous driving particularly if it results in the vehicle coming too close to another vehicle or obstacle.

Variations in the composition and operating characteristics of the motor vehicle indicating and warning system 10 shown in FIGS. 1–3 are noted as follows:

I. The microprocessor or computer 38 may be designed to detect unsafe driving conditions such as excess speed, time of driving at such excess speed and other unsafe driving conditions such as sensed by an accelerometer generating, for example, signals indicative of variations in accelerations and decelerations of the motor vehicle during its operation and movement along highways. Such accelerometer may be supported at a convenient location, such as under the dashboard or adjacent the speed sensor 49 and operable to generate code, pulse or tone signals which are indicative of acceleration, deceleration and, in certain instances, direction of movement of the vehicle or a portion thereof. The microprocessor 38 may be constructed to receive and analyze such accelerometer generated signals and to determine if the driver is operating the vehicle in an unsafe or hazzardous manner whereupon such condition may be indicated by signals generated and transmitted from the microprocessor to the display driver 47, the alarm 62, the synthetic speech synthesizing circuits 67 for generating selected speech signals of words indicative of the unsafe driving condition and to one of the memories 59, 66, a memory of the microprocessor or an auxilliary memory, from which memory may be obtained by a pluggable receiver or a short wave receiver coupled thereto such information on command to determine the manner in which the motor vehicle has been driven. In other words, the microprocessor 38 may also be operable to detect and record unsafe operating conditions in its memory or an auxilliary memory, which recordings may be available for analysis and rating of the manner in which the vehicle has been driven over a period of time and, in certain instances, just prior to and during an accident. If the microprocessor 38 is operable to record signals indicative of the speed of the vehicle as determined by sensor 49, for an extended period of time after which normal recordings are automatically erased from its memory and replaced with new recordings, then an indication will be had of the speed of the motor vehicle and the manner in which it was driven just prior to an accident which may occur for analyzing the cause of the accident. When such indicating signals of speed are combined with signals similarly recorded which indicate accelerations, decelerations and changes in direction of the motor vehicle for a time period prior to the accident, a better indication is had of the cause of the accident and driving conditions just prior to the accident. By automatically analyzing such signals by means of the microprocessor 38 or an auxilliary computer or electronic microprocessor forming part of an instrument plugged into the circuits of FIG. 3, an indication of the manner in which the motor vehicle is being driven may be had and the driver informed of same so as to permit such driver to improve his driving of the vehicle.

II. Keyboard 63 may be selectively operated to query the microprocessor and cause it to control operation of the display 48 and the speech synthesizer 67 to provide respective visual and speech indications of operating conditions of the motor vehicle or machine including indications of fuel-mileage remaining, engine or motor operation and conditions requiring maintenance and the times or dates of such maintenance requirements. Memories 59, 66 or a memory in the microprocessor 38 may contain recordings therein indicative of maintenance functions required according to operational mileage determined by the output of counter 54 and/or the operation of various sensors of operating condition including sensors not illustrated or described above.

III. One or more vibration sensors may be provided at one or more locations on the motor vehicle for sensing vibrations due to faulty motor operation, wheel loosening or misalignment, excessive wheel wear and tire unbalance, vibration of a loose part, bearing wear or malfunction, etc. The outputs of such sensors may be applied to respective inputs of the microprocessor 38 or devices such as counting and logic circuits operable to pass one or more signals on respective circuits to the computer or microprocessor 38 indicative of selected vibrational conditions according to the locations of the sensors, the conditions they sense and the intensity and frequencies of the vibrations. Such analysis and determinations may be made by circuits in the microprocessor 38 with or without signal processing by auxilliary circuits as described. Signals output by the microprocessor 38 as a result of such analysis may be employed to activate the display 48 to control same to display an indication of the malfunction indicated by the vibrations or noise analyzed and/or to the speech synthesizer 67 to cause selected words to be generated which are indicative of the noise indicated condition sensed.

IV. Specific synthetic speech signals may be automatically generated by speech synthesizer 67 under the control of the microcomputer 38 to cause the driver to revert from an unsafe operating condition to a safe operating condition. Warning words such as "slow down", "don't follow so close", "vehicle too close to your rear"; "vehicle approaching from X direction"; "tire pressure low"; "fuel tank low"; "motor overheating"; "time to change oil"; "water needed in radiator"; "battery near discharge"; "tune-up needed"; "stalled car ahead"; "engine is malfunctioning"; "fill up with oil"; "you need an oil change"; "transmission fluid is low"; etc.

V. Specific maintenance functions requiring driver or owner action may be indicated by automatic control of the display driver 47 or the speech synthesizer 67 by the microprocessor or microcomputer 38 such as: "oil change needed"; "tune up needed"; "tire pressure low"; "engine missfiring"; "oil needed"; "oil change required"; "new oil filter required"; "clean (or replace)air filter"; "new spark plugs needed"; "grease needed"; "check transmission fluid"; "lights not operating"; etc.

VI. The microprocessor 38 may be queried by selected operation of the keys of the address keyboard 63 to advise or warn the driver, owner of the motor vehicle or maintenance personnel to determine by microprocessor control of display 48 and/or the speech synthesizer 67, what maintenance functions may be required, what and when such functions will be required, malfunctioning of the vehicle and the manner in which the vehicle has been operated in the past.

VII. Other vehicle operating parameters which may be sensed and visually and/or acoustically indicated with sounds of words describing same and/or indicating corrective actions to be taken by the driver of the vehicle or maintenance personnel include the following: (a) carburetor operating condition and adjustments thereto which are necessary to optimize its operation; (b) exhaust gas analysis by sensing same with one or more sensors which form part of system 10 and generate signals which are processed by computer or microprocessor 38 for use in activating both the speech generating and visual display means described; (c) sensing of battery and generator output voltages by suitable voltage sensors connected to the computer 38 for continuous monitoring of such variables and indicating by speech and visual indicating means such variables and when correction or maintenance is required; (d) sensing of engine operating pressures for indicating faults such as damaged piston rings or leaking valves and indicating such conditions by computer analysis and control of the described speech generating and visual indicating means; (e) inition system sensors for sensing ignition variables and indicating same as described,; (f) brake operating and condition sensing means for indicating under computer control variables therein by visual and speech generating means as described; (g) tire pressure sensing and indication as described.

VIII. Speech signal and speech generation as described may be effected to warn the driver and his passenger when a seat belt is not latched and when a door or doors are unlocked or unlatched as indicated by one or more sensors sensing such conditions and signalling the computer as described.

IX. A short wave receiver of warning signals generated by external means and transmitted thereto from roadside located transmitters the vehicle passes, may be mounted on the vehicle and connected to transmit received code signals to the computer or microprocessor 38 for use thereby in controlling the operation of display 48 or alarm 62, as described, or the synthetic speech signal generator 67 to generate speech signals of words indicative of a roadway condition, an accident ahead, the location of the vehicle, an approaching travel condition, traffic ahead or the weather. Instructions by police or other authorities regarding the travel of the motor vehicle may also be transmitted to the receiver of the vehicle in coded signal form for use by the computer as described to control the display, warning device and/or the synthetic speech signal generator to effect verbal indications of the instructions or condition defined by such short wave signals.

X. If the vehicle using system 10 is an aircraft, sensors of its flying condition and attitude may generate signals which are analyzed by the computer 38 and employed thereby to provide a visual and/or verbal indication of such condition or activate a warning device or warn by means of synthetic speech of such conditions when they approach hazzardous conditions. Radar devices such as described may be employed to provide a warning of proximity of the craft to another craft or flight obstacle.

XI. While the term "synthetic speech signal generator" has been used to describe the circuit 67 for generating speech signals of words indicating vehicle operating parameters, it is noted that such signals may be derived by digitizing and processing analog signals of words spoken into a microphone and recording the results in a memory such as a read only memory (ROM) or a PROM defining at least part of the speech synthesizer 67, XII. In the event that the vehicle containing control and indicating system 10 or a modified form thereof is a hybrid engine driven vehicle, such as an engine operating on gasoline and a secondary fuel such as hydrogen, oil; alcohol or other liquid or gaseous fuel, computer or microprocessor 38 may be constructed and its memory programmed for receiving, processing and performing analyzing operations on signals generated by sensors associated with the operation of such hybrid engine; such as the flow of both fuels to the hybrid engine, combustion and exhaust temperatures, waste heat temperature when such waste heat is used heat one or more chemicals or gases in generating gaseous fuel such as hydrogen by chemical or catalytic reaction, gas pressure, conbustion chamber pressure, condition of catalyst(s), etc. Upon receipt of such variable signals when the engine is operating, the computer 38 may be operable to generate control signals for controlling engine operation to optimize same and save fuel wherein such control signals control gaseous fuel generation and flow and regulate its flow or control such other variables as ignition timing, compression ratio, fuel-air mixture, carburetion, flow of heat transfer fluid through the engine, lubrication by control of an automatic lubricator, etc.

XIII. If the vehicle is driven by an electric motor or motors or is a hybrid vehicle driven both by electric and liquid or gaseous hydrocarbon fuels wherein such electrical energy is derived from a battery or fuel cell, the computer 38 may be constructed and programmed to receive, process and analyze signals generated by sensors as sensors of electric energy employed to power the motor or motors driving the vehicle, battery charge, fuel cell operation and fuel therefore remaining and variables associated with the operation of the electric motors driving the vehicle. The outputs of the computer 38 may be employed to control operating parameters to optimize the operation of the motor vehicle by means as described and to display indications of such operating parameters.

XIV. The computer or microprocessor 38 may also be operable to receive and analyze signals generated by sensors located within or adjacent the wheel bearings, engine or electric motor bearings associated with the vehicle's driving gasoline engine or electric motor or auxilliary electric motors of the motor vehicle, wherein such bearings include electromagnetic means for suspending shafts therein away from the bearing surfaces. Control signals resulting from computer analysis of signals generated by sensors sensing one or more variables as described or shaft position in the bearing may be employed to control the intensity of the bearings magnetic field or the intensities of a plurality of such magnetic fields for each bearing to properly maintain the shaft centrally located in the bearing.

XV. The microphone 70 of FIG. 3 may also be employed to receive sounds of select words of speech spoken by the operator of the motor vehicle and to pass amplified analog speech signals of such words to a speech recognition computer 67B for controlling one or more functions such as the display and/or speech signal and sound playback of selected information associated with the operation of the vehicle as desribed above. Selected words of speech spoken into microphone 70 or another microphone located on the dashboard or the hub of the steering wheel of the vehicle may also be employed to control the synthesizer 67 or an auxilliary speech signal synthesizer or generator to playback or reproduce speech signals of words defining, for example, specific instructions for the vehicle operator to follow to effect proper maintenance functions as described and associated with proper vehicle operation such as instructions to add oil, brake and coolant fluids and how much is needed and to perform other operations necessary to maintain the vehicle in proper operating condition. Additionally, vehicle operating functions such as switching vehicle interior and exterior headlights on an off, starting and stopping windshield wipers by activating and deactivating one or more control switches, and effecting the activation and deactivation of other switches for effecting such functions as starting and stopping a windshield washing fluid pump, energizing and deenergizing a window defrosting device such as a resistance heating element or elements secured to either or both the front and rear windshields; starting and stopping one or more selected window lowering and raising motors and controlling same to either raise or lower one or more selected windows of the vehicle; operating and controlling one or more motors to raise, lower, move forward or backward one or more seats; operating and controlling the operation of the vehicle interior heater and/or air conditioner; releasing the hood latch; releasing the gas filling spout door; effecting and controlling the operation of a motor raising or lowering a radio antenna; controlling one or more variable and bistable means associated with a tape player and /or radio in the vehicle such as switching same on and off, increasing or decreasing the volume control thereof, station or channel changing and/or selection, speaker selection in a multiple speaker system, base and treble control and selection; headlight dimming; parking light on and off; the operation and deactivation of exterior warning lights; turning signal selection and on-off control; selection of prerecorded visual and/or audio signals to be reproduced from a memory to effect speech and or display indications on a display of travel instructions and the selective operation of a vehicle performance computer for controlling the display and/or speech playback of such operating variables as mileage travelled, miles per gallon attained, vehicle speed, time and date. Such control functions may be effected by speaking selected words of speech into the microphone and analyzing the resulting analog speech signals output by such microphone with a speech signal analyzing computer such as provided on the General Instruments Corporation's SP-1000 combined speech chip which includes both speech recognition and speech signal generating circuits for performing all or most of the previpously described speech signal generating and speech signal recognition functions.

XVI. Speech signal recognition means as described above may also be employed to effect the automatic playback of selected speech signals defining, when transduced to sounds of words of speech, instructions to the operator of the vehicle as to how to properly operate and maintain the vehicle in accordance with periodic maintenance requirements.

Where not illustrated in the drawings, it is assumed that the proper power supplies are provided on the correct sides of all electrical circuits and electrically operated devices such as sensors, switches, oscillators, filters, analog-to-digital converters, displays, display drivers, amplifiers, clocks, alarms, counters, microprocessors, and the like to provide proper operation of the components, circuits and system.

A microminiature electronic computer containing both synthetic speech signal generating and speech recognition circuits capable of operational programming to perform one or more of the speech generating and recognition functions described above is available on a single silicon chip as the Model SP-1000 manufactured by the General Instruments Corporation of New York.

I claim:

1. A system for indicating operating characteristics of a motor vehicle comprising in combination with a motor vehicle:
   first means including an electronic computer for processing information and generating output control signals in accordance with variations in the information received by said computer,
   second means including a plurality of sensors which are operable for sensing a plurality of said operating characteristics of the motor vehicle, one of said sensors is for sensing distance travelled by said vehicle and generating first signals indicative of such distance travelled,
   third means for energizing said second means to cause said second means to generate first signals,
   means for operatively connecting said second means to said electronic computer for processing the signals generated by said second means and generating control signals based on the processed result,
   visual display means controlled by said computer to display information defining the operating characteristics of said vehicle,
   synthetic speech signal generating means including a first memory from which speech signals are generatable and define words of speech indicative of operational parameters of said motor vehicle,
   a second memory containing recordings defining periodic maintenance requirements for said motor vehicle,
   means for applying said control signals to said second memory to cause it to generate signals defining specific maintenance requirements, means for applying said latter signals to said speech signal generating means to cause it to generate speech signals defining words and phrases indicative of specific maintenance functions, and
   means for receiving and transducing said speech signals to sounds of words of speech indicative of said specific maintenance functions to be performed on said motor vehicle.

2. A system in accordance with claim 1 wherein said synthetic speech signal generating means is operable, when controlled in accordance with signals generated upon sensing respective distances travelled by said vehicle, to generate synthetic speech signals of words indicative of required changes in fluid employed in operating said motor vehicle.

3. A system in accordance with claim 2 wherein said synthetic speech signal generating means is operable to generate, when controlled by said electronic computer, signals defining words of speech indicating required changes in lubricating oil and an oil filter.

4. A system in accordance with claim 1 wherein said synthetic speech signal generating means is operable, when controlled by said electronic computer, to generate synthetic speech signals of words of speech which indicate required maintenance with respect to the engine of the motor vehicle.

5. A system in accordance with claim 1 including at least one sensing means operable to sense a malfunction in the operation of said motor vehicle and to generate signals indicative of such malfunction for use by said electronic computer in controlling said synthetic speech signal generating means to generate select speech signals defining the malfunction sensed by said one sensor.

6. A system in accordance with claim 1 including a motor for driving said motor vehicle wherein at least one of said sensors operable to sense an increase in the temperature of said motor and said electronic computer is operable to receive and process electrical signals generated by said temperature sensing means and to generate control signals for controlling said speech signal generating means to generate and apply to said transducing means speech signals defining words of speech indicative of such increase in temperature.

7. A system in accordance with claim 1 wherein said visual display means is operable to display indicia indicative of said maintenance requirements.

8. A system in accordance with claim 1 including means for generating the same synthetic speech signals indicative of vehicle maintenance requirements a number of times to permit a person operating said vehicle to be warned by the same words of speech generated more than once.

9. A system in accordance with claim 8 including means controllable by the operator of said vehicle to limit the number of times the same words of speech are generated.

10. A system in accordance with claim 1 wherein said second means includes means for sensing signals generated exterior of said motor vehicle and generating electrical signals of said signals sensed and means for applying said latter electrical signals to control said synthetic speech signal generating means to generate speech signals of selected words of speech indicative of a condition exterior of said vehicle.

11. A system in accordance with claim 1 wherein said motor vehicle contains a speedometer, one of said sensors includes means for sensing the operation of said speedometer and generating pulse signals which vary in accordance with the operation of said speedometer and said distance travelled by said vehicle, means for counting said pulse signals and generating a code indicative of the distance travelled by the vehicle and means for using said code in computing at least one maintenance function of said vehicle.

12. A system in accordance with claim 1 including wave energy generating and directing means supported at one end of said vehicle and receiving means for reflections of such wave energy generated by said wave energy generating means from other vehicles, said latter receiving means being operable to generate signals for processing by said electronic computer, said electronic computer being operable to control said speech signal generating means in accordance with the wave energy received by said receiving means to generate speech signals defining words of speech indicating the proximity of another motor vehicle to said vehicle.

* * * * *